Patented Nov. 13, 1934

1,980,901

UNITED STATES PATENT OFFICE 1,980,901

RESOLUTION OF MIXTURES OF PHENOLS INTO THEIR COMPONENTS

William Henry Bentley, Wallasey, and Benjamin Catlow, Oswaldtwistle, England, assignors to William Blythe & Company Limited, Church, England, a British company No Drawing. Application February 13, 1932, Serial No. 592,842. In Great Britain February 24, 1931

20 Claims. (Cl. 260—154)

This invention relates to improvements in the resolution of mixtures of phenols into their components.

The problem of isolating the components of a mixture of phenols is frequently encountered in chemical industry and various means have been devised for this purpose depending on the differences in physical and chemical properties possessed by the respective phenols of the mixture. Sometimes the separation of phenols from one another presents very considerable difficulty e. g. in the cases of mixtures of meta- and para-cresol, of mixtures of the isomeric xylenols, or of mixtures of halogenated phenols and some of the proposals for effecting this separation involve very drastic chemical treatment resulting in a high cost of operation.

Some of these proposals depend on the formation and subsequent decomposition of sulphonic acids. A process has also been proposed for the manufacture of pure m- and p-cresols from mixtures thereof which depends upon forming double compounds of the components with urea. According to the present invention we accomplish the resolution of mixtures of phenols into their components by taking advantage of the formation of double compounds of one or more of the components with aromatic amines containing at least one basic amino group and then use the difference in physical properties of the resulting compounds as a means of separation. It will be seen therefore that the invention does not include the use of compounds such as benzamide and the like acid amides since these do not contain a basic amino group. The aromatic amines which we employ may be mono- or di-substituted. Preferably diamino compounds are employed.

Phenols unite with such aromatic amines, for example diamines of the benzene, naphthalene, or diphenyl series, or their respective derivatives, to give double compounds which in general are solid substances at the ordinary temperature and are sufficiently stable to be capable of crystallization from certain neutral solvents.

As examples of these double compounds we may cite the following:—

| Components | | Compound | |
|---|---|---|---|
| Phenolic | Basic | Formula | M.P. °C. |
| Phenol | Benzidine | $C_{12}H_{12}N_2,2C_6H_6O$ | 140 |
| Ortho-cresol | Benzidine | $C_{12}H_{12}N_2,2C_7H_8O$ | 97 |
| Meta-cresol | Benzidine | $C_{12}H_{12}N_2,2C_7H_8O$ | 95 |
| Do | Tolidine | $C_{14}H_{16}N_2,2C_7H_8O$ | 97 |
| Do | Dianisidine | $C_{14}H_{16}O_2N_2,2C_7H_8O$ | 82 |
| Do | Para-phenylene diamine | $C_6H_8N_2,2C_7H_8O$ | 59 |
| Para-cresol | Benzidine | $C_{12}H_{12}N_2,2C_7H_8O$ | 140 |
| Do | Tolidine | $C_{14}H_{16}N_2,2C_7H_8O$ | 63 |
| Do | Dianisidine | $C_{14}H_{16}O_2N_2,2C_7H_8O$ | 84 |
| Do | Para-phenylene diamine | $C_6H_8N_2,2C_7H_8O$ | 109 |
| Do | Meta-tolylene-diamine | $C_7H_{10}N_2,C_7H_8O$ | 50 |
| Chlor-meta-cresol ($CH_3$:1,OH:3,Cl:6) | Benzidine | $C_{12}H_{12}N_2,2C_7H_7OCl$ | 110 |
| Do | Tolidine | $C_{14}H_{16}N_2,2C_7H_7OCl$ | 96 |
| Chlor-para-cresol ($CH_3$:1,OH:4,Cl:5) | Benzidine | $C_{12}H_{12}N_2,2C_7H_7OCl$ | 89 |
| Do | Tolidine | $C_{14}H_{16}N_2,2C_7H_7OCl$ | 69 |
| Para-ethyl-phenol | Benzidine | $C_{12}H_{12}N_2,2C_8H_{10}O$ | 138 |
| Do | Tolidine | $C_{14}H_{16}N_2,2C_8H_{10}O$ | 57 |
| Meta-xylenol (1:3:5) | Benzidine | $C_{12}H_{12}N_2,2C_8H_{10}O$ | 68 |
| Do | Tolidine | $C_{14}H_{16}N_2,2C_8H_{10}O$ | 85 |
| Para-xylenol (1:4:2) | Benzidine | $C_{12}H_{12}N_2,2C_8H_{10}O$ | 84 |
| Do | Tolidine | $C_{14}H_{16}N_2,2C_8H_{10}O$ | 82 |
| Guaiacol | Benzidine | $C_{12}H_{12}N_2,2C_7H_8O_2$ | 85 |
| Do | Tolidine | $C_{14}H_{16}N_2,2C_7H_8O_2$ | 80 |
| Creosol $CH_3$:1,$OCH_3$:3,OH:4 | Benzidine | $C_{12}H_{12}N_2,2C_8H_{10}O$ | 60 |
| 1:3:4-dinitrophenol | 1:3:5-diamino benzamide | $C_7H_9ON_3,C_6H_4O_5N_2$ | 165 |
| Resorcinol | Benzidine | $C_{12}H_{12}N_2,2C_6H_6O_2$ | 145 |

Chemical compounds are not formed in all cases and it is therefore necessary to select an appropriate aromatic amine with reference to the nature of the components to be separated. This, however, is not a disadvantage as it enables amines to be employed which form compounds selectively with certain only of the components.

As examples of cases in which no combination occurs where it might have been expected we may mention the following:—

Meta-tolylene diamine and meta-cresol.
Para-para-diamino-diortho-tolyl-methane and meta-cresol.
Para-para-diamino-diortho-tolyl-methane and para-cresol.
Tolidine and creosol.
Benzidine and methyl salicylate.
Tolidine and methyl salicylate.
1:3:5-diamino-benzamide and phenol.
1:3:5-diamino-benzamide and the cresols.

Solutions of these bases in the hot phenolic liquids deposit the bases unchanged on being cooled.

By the application of the present invention we are enabled to effect separations of mixtures of phenols by selecting a suitable aromatic amine which will give double compounds with one or more of the separate constituents of the phenolic mixture, which compounds are sufficiently far apart in physical characteristics (e. g. melting points, solubilities etc.) from one another or from the original phenols as to be easily capable of separation.

Having selected a suitable aromatic amine for this purpose the union with the phenolic mixture is effected and the constituents separated by partial fusion or solidification and removal of the higher melting solid compound or by fractional crystallization from suitable neutral solvents or by a combination of these methods or by any other suitable method of separation. The respective pure compounds of aromatic amine and phenols are then suitably treated for the isolation of the latter and the recovery of the former for further use.

For instance the double compound may be treated with acids to remove the aromatic amine and leave the phenol, or it may be treated with alkalies to remove the phenol (as the alkali salt) and leave the aromatic amine, or preferably the aromatic amine and phenol may be isolated by heating to the temperature of dissociation and separation by fractional distillation.

The process of the present invention is particularly suitable for the separation of meta- and para-cresols from their admixtures. This is a process of the utmost technical value because these important cresols are contained together in commercial cresylic acid derived from coal tar and hitherto have only been isolated in the separate state by methods of considerable difficulty.

The following examples illustrate how the invention may be put into practice. All parts referred to are by weight.

EXAMPLE 1

216 parts of a mixture of equal parts of meta- and para-cresol are heated to 100° C. and stirred while 92 parts of benzidine are added. When the benzidine is all dissolved the agitation is stopped and the molten mixture allowed to cool to the atmospheric temperature whereby crystallization takes place, the crystals consisting mainly of the compound of benzidine and para-cresol interspersed in an oily medium consisting mainly of meta-cresol. When the mixture is quite cold, the crystalline portion is separated from the accompanying oil by filtration under strong pressure first in the cold state and later while gradually raising the temperature of the mass to about 90° C.

The press cake thus obtained (183 parts) is practically the pure compound of benzidine and para-cresol. By simple distillation (preferably under very low pressure to avoid a high temperature and preserve the benzidine) it can be resolved into a distillate consisting of almost pure para-cresol and a residue of benzidine which can be used directly for the treatment of another batch of mixed meta- and para-cresol.

The para-cresol obtained at this stage still contains a little benzidine which has distilled over with it but a second distillation yields technically pure para-cresol which solidifies on cooling, the yield being about 90 parts.

The oil (123 parts) pressed out from the above described press-cake consists mainly of meta-cresol, much less para-cresol and a little benzidine. The meta-cresol may be isolated from it by adding more benzidine to it to convert all the cresol present into the double compound and re-crystallizing the product from suitable neutral organic solvents until the pure compound of benzidine and meta-cresol is obtained. This is then resolved by distillation at low pressure into meta-cresol and benzidine exactly in the same manner described already for the obtainment of para-cresol from its compound with benzidine.

We preferably use, however, an alternative method of obtaining meta-cresol from the oil pressed out from the crystalline cake of the benzidine and para-cresol compound as it possesses two advantages viz (1) no solvent is required and (2) the meta-cresol is obtained in a purer condition with less trouble.

In order to carry out this method another aromatic amine is selected which, while it forms compounds with meta- and para-cresol, gives a meta-cresol compound melting at a substantially higher temperature than the para-cresol compound.

Such an aromatic amine is ortho-tolidine; the melting point of its meta-cresol compound is 97° C. while that of the para-cresol compound is 63° C.

The consequence of this is that whereas benzidine when dissolved in an excess of a hot mixture of meta- and para-cresol produces on crystallization by cooling mostly the compound with para-cresol, ortho-tolidine on the other hand produces by the same operation mostly the compound with meta-cresol.

Therefore we carry out the process in the following manner:—

The oily filtrate (123 parts) separated by filtration and hot pressing from the compound of benzidine and para-cresol described in the early part of this example is freed from benzidine preferably by distillation at a low pressure (the benzidine remaining behind is added to the major part of the recovered benzidine and used over again in subsequent operations) and this yields about 114 parts of an oil containing about 85 per cent meta-cresol and 15 per cent of para-cresol.

This oil is heated to 80–90° C. and to it is added 83 parts of ortho-tolidine with gentle agitation. When all is fluid the mixture is allowed to cool to the ordinary temperature whereby crystallization occurs. The crystalline mass is filtered under strong pressure, at first in the cold state, and later while gradually raising the temperature of the mass up to 60° C.

The press cake thus obtained amounts to about 160 parts and is the practically pure compound of ortho-tolidine and meta-cresol. To obtain the meta-cresol the product is distilled preferably at the lowest convenient pressure to avoid a high temperature and thus preserve the ortho-tolidine. The meta-cresol obtained as the distillate is advantageously re-distilled to remove from it the small quantity of ortho-tolidine which comes over in the first distillation, and is thus obtained in a state of purity of 99–100%. The yield is approximately 80 parts. The ortho-tolidine obtained as a residue in the still after the distillation is used over again in subsequent operations.

The oily liquid which has been pressed out from the above described ortho-tolidine-meta-cresol compound amounts to about 35 parts and contains meta- and para-cresol in almost equal parts and also a little ortho-tolidine. It is subjected to distillation to recover the ortho-tolidine which is added to the major portion of the recovered ortho-tolidine before mentioned. The oily distillate thus obtained may be incorporated with a fresh batch of starting material (i. e. mixed meta- and para-cresol) for treatment by the process, e. g. with benzidine, or it may be disposed of in any other suitable manner.

In the foregoing example, starting with a mixture of equal parts of meta- and para-cresol, instead of commencing by making the benzidine compound first and the ortho-tolidine compound afterwards we may reverse the order and make the ortho-tolidine-meta-cresol compound first and the benzidine-para-cresol compound afterwards.

If the mixture of the meta-cresol and para-cresol does not consist of equal parts of each, the preponderance of one or the other constituent, if large, will determine the order of using these organic bases.

The best results are generally obtained by first removing the preponderating component, although in some cases a constituent present in a minor proportion may be most advantageously first removed if it forms with a selected amino compound a double compound of very substantially higher melting point or lower solubility in some solvent than the component or components which preponderate or the double compound thereof with the selected amino compound. For example, if the mixture contained 75 per cent meta-cresol and 25 per cent para-cresol the start would advantageously be made with tolidine, but if the mixture contained 75 per cent para-cresol and 25 per cent meta-cresol, then the start of the operations would preferably be made with benzidine. It may be mentioned, however, that the compound of benzidine and para-cresol has a melting point so much above that of the compound of benzidine and meta-cresol that it is quite practicable and even preferable to remove the para-cresol first by the aid of this double compound even when the meta-cresol constitutes up to about 70% of the mixture.

The method of the foregoing example may be applied to the separation of chlor-para-cresol (CH₃:1,OH:4,Cl:5) and para-cresol from mixtures thereof. These two compounds have almost the same boiling point and cannot be separated by fractional distillation. Their separation can readily be effected by the aid of the double compounds formed with benzidine and tolidine.

EXAMPLE 2

The separation from crude xylenol of
(1) Para-ethyl phenol
(2) Meta-xylenol (1.3.5)
(3) Para-xylenol (1.4.2)

*Para-ethyl-phenol*

Crude xylenol (300 parts boiling at 208 to 220° C.) is mixed with benzidine (160 parts) and the mixture stirred and heated until it is all fluid and then allowed to cool to the atmospheric temperature. The mixture becomes semisolid whereupon it is pressed free from oil, at first in the cold but afterwards while gradually raising the temperature up to 120° C. The press cake is then broken up, placed in a still (preferably vacuum) and carefully distilled so that para-ethyl-phenol distils over leaving a residue of benzidine. The para-ethyl-phenol is free from the small proportion of benzidine which accompanies it preferably by a second distillation and cooled until solidification takes place. It is then obtained technically pure by pressing away any adhering oil.

*Meta-xylenol (1.3.5)*

The oil pressed away from the benzidine compound of para-ethyl-phenol (described above) is freed from benzidine preferably by distillation under reduced pressure and is then mixed with tolidine (120 parts) and stirred and heated until complete fluidity is obtained. The liquid is then allowed to cool to the atmospheric temperature and the resulting semi-solid paste is pressed free from oil firstly in the cold and afterwards while gradually raising the temperature up to 70° C. The press cake is then, as in the foregoing case, carefully vacuum distilled and thus separated into a distillate consisting of meta-xylenol (1.3.5) and a residue of tolidine. The distillate is preferably redistilled to remove any accompanying tolidine and afterwards cooled to solidification. The solid product is pressed to remove adhering oil and is then technically pure meta-xylenol (1.3.5).

*Para-xylenol (1.4.2)*

The oil pressed out from the double compound of tolidine and meta-xylenol (1.3.5) mentioned above is freed from tolidine preferably by vacuum distillation and then mixed with benzidine (80 parts) and stirred and heated until all is fluid and finally cooled to the atmospheric temperature. The resulting pasty mass is thoroughly pressed in the cold and the oil thus pressed out is removed.

The solid cake in the press at this stage consists mainly of a mixture of the benzidine compounds of para-xylenol and of such para-ethyl-phenol as has escaped removal in the first treatment of the crude xylenol with benzidine.

To separate pure para-xylenol from this press cake we proceed as follows:—

The pressing is continued while the temperature of the press is gradually raised to 90° C. and the oil thus pressed out is vacuum distilled to separate it into crude para-xylenol (distillate) and benzidine (residue). The crude para-xylenol is preferably redistilled to remove the last traces of benzidine and then mixed with half its weight of tolidine, heated and stirred until all is fluid and cooled to the ordinary temperature. The pasty mass which results is pressed free from oil at first in the cold and then at a temperature which is gradually raised up to 60° C. The press cake is then vacuum distilled and the oily distillate (para-xylenol) redistilled and cooled until solid para-xylenol separates out which is then freed from adhering oil by pressure and thus obtained as technically pure para-xylenol. The benzidine compound of the para-ethyl-phenol is treated by distillation for recovery of the phenolic component as described in the earlier part of the example.

The crude xylenol employed in this example is the average technical product containing appreciable quantities of the three phenolic substances the isolation of which is described. But it is known that crude xylenol contains a fairly large number of phenolic substances of relatively varying amounts, and therefore according to its variable composition we may vary the amounts of amino-bases used and we may also employ aminobases other than those described in this example (viz.: benzidine and tolidine) in order to isolate any of the phenolic substances contained in the crude xylenol. It is always to be preferred to make a preliminary examination of the raw material before deciding upon the modus operandi.

EXAMPLE 3

The separation of guaiacol and of creosol from beech tar creosote.

Beech tar creosote is first subjected to a very thorough fractional distillation, and the two fractions (a) boiling at 205–208° C. and (b) boiling at 218–221° C. are collected separately.

*Guaiacol*

The fraction (a) boiling at 205–208° is mixed with half its weight of tolidine, stirred and heated until the mixture is fluid. It is then allowed to cool to the ordinary temperature.

The resulting paste is then pressed firstly in the cold and then at a temperature raised gradually up to 65° C. The press cake is then separated by vacuum distillation into crude guaiacol (distillate) and tolidine (residue).

The distillate is freed from tolidine preferably by another distillation and cooled to a temperature low enough to freeze out the guaiacol which is then obtained technically pure by pressing out (or centrifuging) the adhering oily impurity.

*Creosol*

The fraction (b) boiling at 218–221° is mixed with half its weight of tolidine, stirred and heated until the mixture is fluid and then cooled to the ordinary temperature. The resulting paste is then thoroughly pressed until all the oily part has been removed. As tolidine does not form a compound with creosol the latter is contained in the pressed out oil. This is distilled to free it from tolidine and then heated with half its weight of benzidine until the latter is dissolved. The mixture is cooled to the ordinary temperature and the paste obtained is pressed free from oil at first in the cold and then at a temperature which is raised gradually up to 40° C. The press cake which is the compound of benzidine and creosol is vacuum distilled to give creosol as distillate leaving a residue of benzidine. A second distillation of the creosol renders it technically pure.

The method of the foregoing example may be applied to the separation of eugenol from admixture with iso-eugenol. Tolidine forms a double compound with eugenol but not with iso-eugenol.

EXAMPLE 4

The separation of chlor-meta-cresol ($CH_3$:OH:Cl—1:3:6) from crude mono-chlorinated meta-cresol.

Crude mono-chlorinated meta-cresol is washed free from hydrochloric acid, dried and distilled. The bulk of the oil distills between 210° and 235° C. and this fraction is collected and mixed with half its weight of tolidine and stirred and heated until all is fluid. The mixture is then cooled to the ordinary temperature whereby the tolidine compound of the chlor-meta-cresol separates out. The pasty mass is pressed free from oil at first in the cold and afterwards to a temperature which is gradually raised up to 80° C. The press cake is then vacuum distilled to separate it into chlor-meta-cresol (distillate) and tolidine (residue).

The chlor-meta-cresol is preferably redistilled and the distillate, which solidifies on cooling to the ordinary temperature, is pressed free from adhering oil and a technically pure chlor-meta-cresol ($CH_3$:OH:Cl—1.3.6) is thus obtained.

EXAMPLE 5

The separation of 1.3.4 dinitro-phenol from admixture with phenols and mono-nitro phenol by means of 1.3.5 diamino-benzamide.

Crude phenol (containing cresols) holding in solution about 15 per cent by weight of mono-nitro-phenol and 20 per cent of 1.3.4 dinitro-phenol is treated with an amount of 1.3.5 diamino-benzamide equal to five-sixths of the weight of dinitro-phenol present. The mixture is heated until completely liquid and then cooled to the ordinary temperature whereby the double compound of 1.3.4 dinitro-phenol and 1.3.5 diamino benzamide

$$C_6H_3(NO_2)_2OH, C_6H_3(NH_2)_2CO.NH_2$$

separates out as a yellow solid. This product is filtered off and pressed dry. The yellow solid is macerated with a slight excess (tested by Congo red) of dilute hydrochloric acid until it is completely decomposed into 1.3.5 diamino-benzamide which goes into solution as hydrochloride and 1.3.4 dinitro-phenol which remains out of solution. The latter is filtered off, washed clean with water and dried at 100° C. and thus obtained in a practically pure condition.

The invention is not of course limited to the above examples which may be varied in many of their details. The invention moreover may be applied to the resolution of other phenolic mixtures. Aromatic amines other than those indicated above may be employed. Although the invention does not include the use of compounds containing acid amido groups alone; compounds containing such groups in addition to the basic amino groups may be employed, e. g., diamino-benzamide $(NH_2)_2.C_6H_3$—CO—$NH_2$.

We declare that what we claim is:—

1. Process for the separation of the components of a mixture of phenols which includes causing at least one of said components to undergo double compound formation with an aromatic amine containing at least one basic amino group and thereafter separating the resulting compounds by virtue of their difference in physical properties.

2. Process for the separation of the components of a mixture of phenols which includes causing one of said components to undergo double compound formation with an aromatic amine containing at least one basic amino group and separating the double compound so formed from the mixture.

3. Process for the separation of a mixture of meta-cresol and para-cresol which includes causing one of said cresols to undergo double compound formation with an aromatic amine containing at least one basic amino group and separating the double compound so formed from the mixture.

4. Process for the separation of a mixture of meta-cresol and para-cresol which includes causing one of said cresols to undergo double compound formation with an aromatic amine containing at least one basic amino group, removing the compound so formed from the reaction mixture, causing the remaining cresol to undergo double compound formation with further aromatic amine containing at least one basic amino group and removing such further double compound from the mixture.

5. Process for the separation of the components of a mixture of phenols which includes causing at least one but not all of said components to undergo double compound formation with an aromatic amine containing at least one basic amino group, removing the double compound so formed from the mixture, causing at least one of the remaining components to undergo double compound formation with further aromatic amine containing at least one basic amino group and removing such further double compound from the mixture.

6. Process as claimed in claim 1 in which the mixture of phenols is treated with the same aromatic amine containing at least one basic amino group in a plurality of stages and double compound is separated from the mixture at each stage of the treatment.

7. Process as claimed in claim 1 in which the component present in greatest proportion is caused to undergo double compound formation with an aromatic amine containing at least one basic amino group and the resulting double compound is separated from the mixture.

8. Process as claimed in claim 5 in which said further aromatic amine is different in nature from said aromatic amine first employed.

9. Process as claimed in claim 5 in which at least one of said aromatic amines is benzidine.

10. Process as claimed in claim 5 in which at least one of said aromatic amines is tolidine.

11. Process as claimed in claim 4 in which at least one of said aromatic amines is a diamine.

12. Process as claimed in claim 4 in which both of said aromatic amines are diamines.

13. Process as claimed in claim 1 in which the aromatic amine is a diamine.

14. Process as claimed in claim 4 in which at least one of said aromatic amines is benzidine.

15. Process as claimed in claim 4 in which at least one of said aromatic amines is tolidine.

16. Process as claimed in claim 5 in which said aromatic amines comprise respectively benzidine and tolidine, the former being employed first whenever the mixture contains not more than about 70% of meta-cresol.

17. Process as claimed in claim 1 in which the mixture of phenols is treated with different aromatic diamines in sequence and a double compound is separated from the mixture after each treatment.

18. Process as claimed in claim 1 in which the phenol is isolated from the double compound by decomposition of said double compound with heat and fractional distillation of the aromatic amine and the phenol.

19. Process as claimed in claim 5 in which said double compounds after removal from the mixture are decomposed by heat and the aromatic amine and phenols are then separated by fractional distillation.

20. Process for the separation of meta-cresol and para-cresol from technical cresylic acid which consists in first treating the mixture with a quantity of benzidine approximately sufficient to combine with all the para-cresol present, causing such combination to take place and isolating the double compound of benzidine and para-cresol, next treating the residual mixture with a quantity of tolidine approximately sufficient to combine with all the meta-cresol present, causing such combination to take place and isolating the double compound of tolidine and meta-cresol, and finally decomposing said double compounds, and isolating the respective cresols therefrom.

WILLIAM HENRY BENTLEY.
BENJAMIN CATLOW.